United States Patent [19]

Johnson

[11] 3,868,141
[45] Feb. 25, 1975

[54] VEHICULAR SAFETY DEVICE

[75] Inventor: John E. Johnson, Madison, Wis.

[73] Assignee: The Dow Chemical Company, Midland, Mich.

[22] Filed: July 27, 1973

[21] Appl. No.: 383,430

Related U.S. Application Data

[63] Continuation-in-part of Ser. No. 370,243, June 15, 1973, abandoned.

[52] U.S. Cl. ............... 296/28 R, 49/502, 188/1 C, 296/146
[51] Int. Cl. ............................................. B60r 21/02
[58] Field of Search ............ 296/146, 28 R; 49/502, 49/503; 188/1 C

[56] References Cited
UNITED STATES PATENTS 3,700,076  10/1972  Forsting .......................... 49/502 X

FOREIGN PATENTS OR APPLICATIONS 1,597,263  6/1970  France ............................. 296/146
1,085,891  3/1967  Great Britain .................... 296/146
1,806,716  6/1970  Germany .......................... 296/28 R Primary Examiner—David Schonberg
Assistant Examiner—John A. Pekar
Attorney, Agent, or Firm—Robert B. Ingraham

[57] ABSTRACT

An improved vehicle door is provided which is resistant to impact at high deflection. Such a door is provided by incorporating within the door in a region most likely to be subject to impact, a plurality of horizontally extending resilient members supported generally adjacent opposing portions of the door frame. Beneficially, the resilient members are a composite material such as a hardened synthetic resin and a plurality of longitudinally extending resilient fibers such as fibers of glass.

11 Claims, 8 Drawing Figures

PATENTED FEB 25 1975 3,868,141

VEHICULAR SAFETY DEVICE

This application is a continuation-in-part of my earlier filed application Ser. No. 370,243 filed June 15, 1973 now abandoned.

Road vehicles such as automobiles and the like in the past generally have offered relatively little protection to an occupant from side impact. A collision wherein, for example, a vehicle impacts another vehicle in the region of a door, can result in crumpling of the sheet metal door structure with relatively little force and the door or portions thereof would be forced inwardly into the vehicle in such a manner that the occupant is severly injured. Various attempts have been made to increase the strength of vehicle doors such as automobile doors by the incorporation of reinforcing members. Such reinforcing members generally are either sheet metal channels or corrugated sheet metal bodies wherein the channels or corrugations extend generally horizontally within the door. Such reinforcement offers some benefits and protection to the occupants of the vehicle. However, once such channel or corrugated member is deflected sufficiently to buckle, their resistance to further penetration by the colliding object decreases rapidly and therefore they offer protection only under conditions where the force of the collision is less than that which is required to cause significant buckling. Such channels when prepared from metals add substantially to the weight of the door and to the weight to the vehicle.

It would be desirable if there was available an improved door construction for vehicles such as automobiles which would offer substantial resistance to impact.

It would also be desirable if there was available an improved door construction for automobiles which would provide substantial resistance to impact and which would deflect to a substantial degree without a decrease in the impact resisting force.

It would further be desirable if such a door or vehicular side member were available which could be fabricated employing readily available materials.

These benefits and other advantages in accordance with the present invention are achieved in a vehicle member, the vehicle member comprising a supporting frame, the supporting frame enclosing therein a region of probable impact and first and second frame portions generally oppositely disposed and having therebetween the region of probable impact, at least one resilient deflectable member disposed between opposed frame portions and supported by said frame portions.

Further features and advantages of the present invention will become more apparent from the following specification taken in connection with the drawing wherein.

Figure 1:
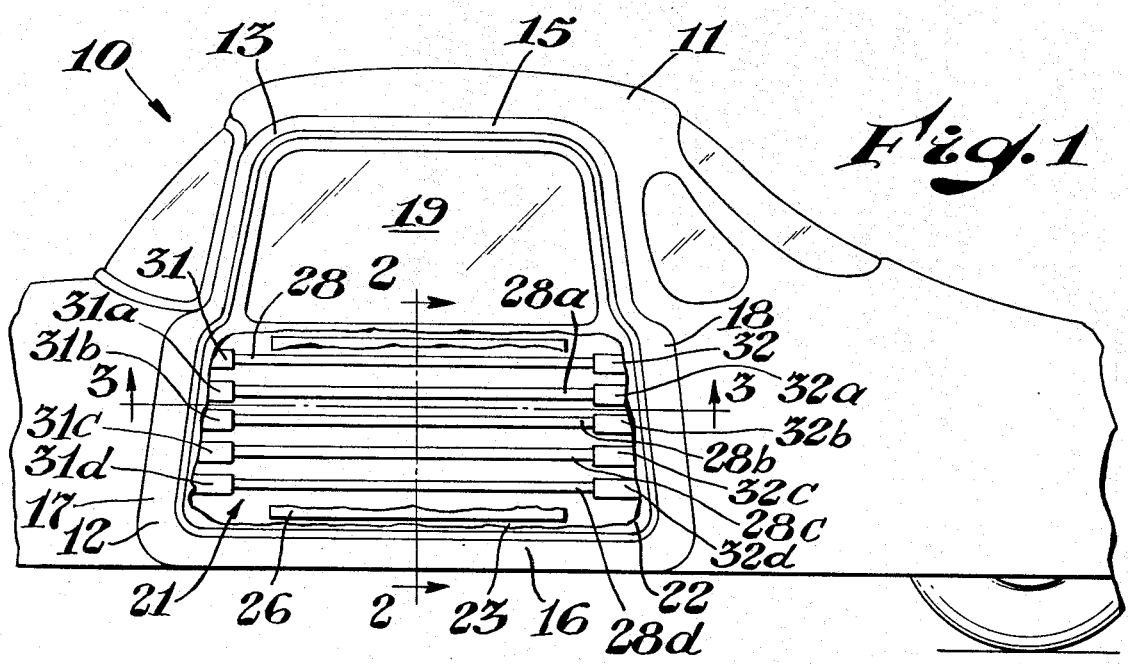
FIG. 1 is a schematic cutaway view of a vehicle in accordance with the present invention.

In FIG. 1 there is schematically depicted a partial new vehicle in accordance with the present invention generally designated by the reference numeral 10. The vehicle 10 comprises an automobile 11 having a cutaway view of a door or protective member 12. The door 12 has a generally rigid frame member 13 disposed generally about the periphery thereof. The frame 13 has an upper portion 15 and a lower portion 16, a first or forward portion 17 and a second or rearward portion 18. A window region 19 is disposed between the members 17 and 18 generally adjacent the upper portion 15. Below the window portion 19 and above the lower portion 16 is a region of probable impact 21. An external skin or outer surface member 22 covers the frame 12 in the region below the window portion 19 and the lower frame member 16, an interior skin member 23 is generally oppositely disposed to the outer skin member 22 and defines an internal door space 25. Within the internal door space 25 is disposed a window raising and lowering mechanism 26 disposed generally adjacent the inner skin member 23. (Details of the window and raising and lowering mechanism 26 are well known in the art and do not constitute a portion of the invention and therefore are not shown in detail.) A plurality of generally horizontally extending resilient members 28, 28a, 28b, 28c and 28d extend laterally within the space 25 between the lower portions of the frame members 17 and 18 and in the region of most probable impact. Beneficially, the resilient member 28–28d are deflectable bar-like elements of a plurality of resilient fibers such as glass fibers in a synthetic resinous matrix such as an epoxy resin matrix or polyester resin matrix. Such materials are well known in the art and are frequently prepared by the process known as pultrusion wherein, the fibers, as a tow or as woven or nonwoven fabrics are drawn through a hardenable liquid resinous bath, through a shaping die and appropriate heating and curing ovens. Such shaped members are available commercially in the form of rods, bars and the like. Usually the most desirable members are flat bars having a generally rectangular cross section, when function and ease of preparation of the bars are considered. Affixed to the frame members 17 are a plurality of sockets or support means 31, 31a, 31b, 31c and 31d, the sockets being sequentially arranged with the socket 31 remote from the lower frame portion 16 and the socket 31d generally adjacent the lower frame member 16. A similar series of sockets 32, 32a, 32b, 32c and 32d are oppositely disposed to the sockets 31–31d and affixed to the rearward portion of the frame 18. With respect to the door frame, the sockets 31–31d and 32–32d are in inwardly disposed and inwardly opposed facing relationship and each pair of sockets support therein one of the resilient members 28–28d. The resilient members 28–28d, sockets 31–31d and sockets 32–32d are disposed generally in a planar arrangement more or less conforming to the shape of the frame 12.

Figure 2:
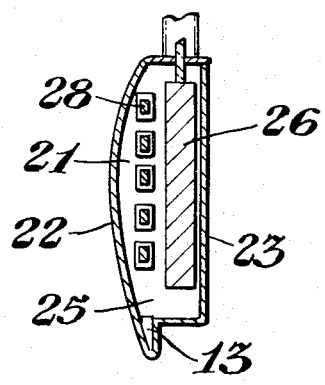
FIG. 2 is a schematic sectoinal representation of the door of the vehicle of FIG. 1 taken along the line 2—2 of FIG. 1.

FIG. 2 is a sectional view of the door of FIG. 1 taken along the line 2—2 thereof depicting the arrangement of flexible members 28–28d and their corresponding sockets within the space 25 of the door 12.

Figure 3:
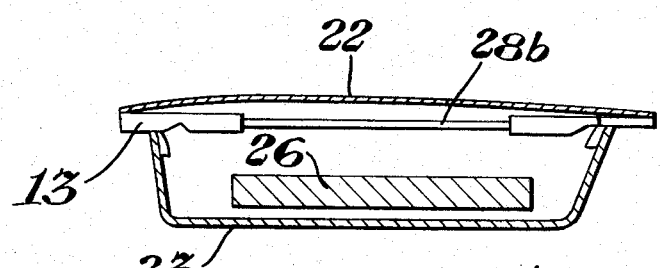
FIG. 3 is a schematic sectional view of the door shown in FIG. 1 taken along the line 3—3 thereof.

FIG. 3 depicts a schematic sectional view of the door 12 taken along the line 3—3 thereof to further clarify the position of the resilient elements 28-28d within the door.

Doors in accordance with the present invention in normal use are operated in the conventional manner. The locking and latching mechanisms and window actuators operated in a conventional manner are undisturbed by the presence of the resilient members 28-28d. On impact by an object, for example, a right front fender of a vehicle, in a region generally along the line 2—2 of FIG. 1, the exterior skin, such as the skin 22 of metal sheet, crumples readily, or if a so-called fiber glass construction bends and possibly fractures, the load is then transmitted to the resilient members 28 which bend inwardly exerting an ever increasing force on the impacting object while exerting at least a portion of this force on the sockets 31–31d and 32–32d affixed to the frame members. Beneficially, the members 28 as they are flexed are partially withdrawn from the sockets 31 and 32 in which advantageously they are frictionally retained. The window mechanism such as the mechanism 26 can be destroyed and very large deformation of the flexible members is achieved while still resisting the impact force. In most instances it is undesirable to rigidly anchor the resilient members 28-28d in their respective sockets as on impact the spacing between the frame portions 17 and 18 is significantly reduced. The door 12 depends at least in part for its impact resistance on the continued contact with the automobile body rather than being deformed and pushed therein. Thus, in effect the combination of the sockets 31 and 32 and the bar 28 provides a variable length link between the frame portions 17 and 18 when force is exerted on the bar such as the bar 28. The bar can partially withdraw from the sockets 31 and 32 but exerts relatively little force on the frame members 17 and 18 which would serve to draw them closer together. The action of the bars 28–28d is generally identical. Beneficially, such resilient members contain between 40 and 75 weight percent glass fibers, and most beneficially from 50 to 65 weight percent glass fibers.

In an arrangement such as depicted in FIGS. 1, 2 and 3, the use of five one inch square bars is satisfactory to resist a 7000 pound load when the bars are 48 inches in length and deflect a distance of 18 inches.

Figure 4:
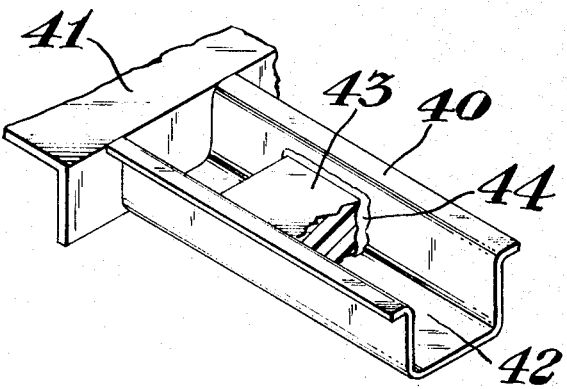
FIG. 4 is a schematic cutaway representation of a mode of affixing deflectable members in accordance with the invention.

FIG. 4 schematically depicts an alternate manner of supporting a bar such as the bar 10 of FIG. 1. Channel members 40 are rigidly affixed to a door frame 41. The channel members 40 define therein a recess or channel 42 in such a manner that the channel is adjacent an outer skin such as the skin 22 of FIGS. 1–3. Disposed within the channel is a portion of a rigid bar 43 equivalent to the bars 28–28d of FIGS. 1–3. The bar 43 is yieldably affixed to the channel member 40 by means of an adhesive 44 such as a mastic or the like. The adhesive 44 is low strength adhesive suitable to maintain the bar 43 in position under normal use to prevent rattling and displacement thereof. However, under conditions of impact it fails and allows displacement of the bar 43 as it is bent by the force of impact. The composition of the adhesive 44 is not critical and a wide variety of non-hardening and hardening materials are eminently satisfactory including roofing compounds, putty, contact cement and the like.

Figure 5:
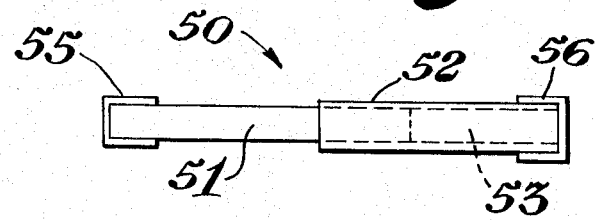
FIG. 5 depicts an alternative means of installing flexible members in accordance with the present invention.

In FIG. 5 there is depicted an alternate resilient telescoping member suitable for use in the practice of the present invention general designated by the reference numeral 50, the resilient member 50 having a first or inner portion 51 and a second or outer portion 52. The outer portion 52 has defined therein a longitudinally extending passageway 53 which slidably receives at least a portion of the inner member 51. The inner member 51 remote from the outer member 52 is affixed within a socket or support means 55 which in turn is affixed to a frame member, not shown. A portion of the outer member 52 is disposed within a support means or socket 56 also affixed to a frame member, not shown.

Employing resilient elements such as the element 50, the ends of the elements 50 are more or less rigidly affixed to the frame and on bending elongation is achieved by withdrawal of the element 51 from the passage 53 of the outer portion 52. Beneficially, elements such as the elements 51 are fabricated from resilient materials such as are employed for the elements 28–28d of FIGS. 1–3 and 43 of FIG. 4.

Figure 6:
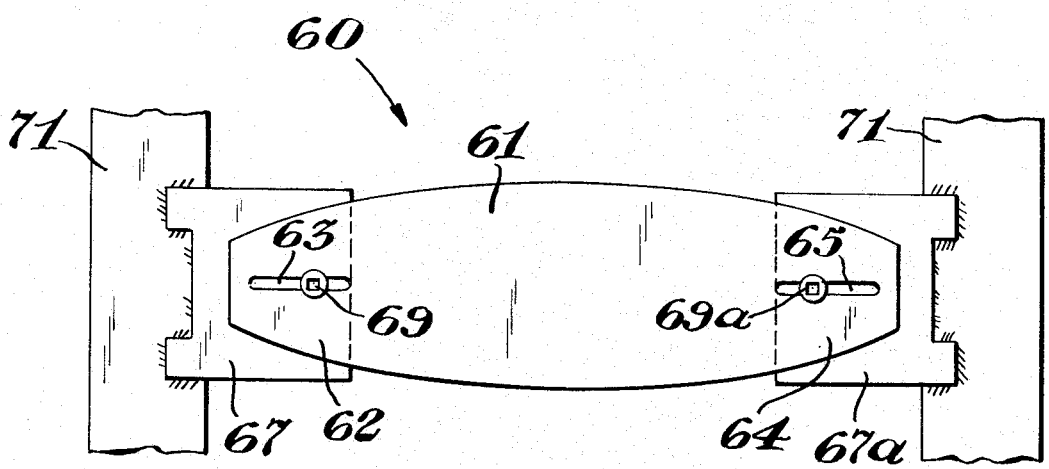
FIGS. 6 and 7 are alternate embodiments of the invention.

In FIg. 6 there is depicted a fractional view of an alternate embodiment of the invention generally designated by the reference numeral 60. The embodiment 60 comprises a resilient elongate bar 61 having a generally rectangular cross-section and a pair of generally parallel major edges having a convex configuration. The bar 61 has a first end 62 defining a first slot 63 and a second end 64 defining a second slot 65. The slots 63 and 65 extend entirely through the member 61 and extend in a direction generally parallel to the major axis thereof. A support plate 67 is disposed generally adjacent the first end 62 and a similar support plate 67a adjacent the end 64. The support plates 67 and 67a have in association therewith retaining means 69 and 69a, respectively. The retaining means such as a bolt or pin extend through the slots 63 and 65 and serve to maintain the member 61 adjacent the support plates 67 and 67a and permit lateral movement of the retaining means 69 and 69a in the slots 63 and 65 when the member 61 is deflected. The support members 67 and 67a are affixed to a frame 71 such as the frame of an automobile door. The support members 67 and 67a, beneficially when sufficient force is applied to the member 61, are capable of plastic deformation and beneficially are of steel.

The embodiment of FIG. 6 is particularly desirable when relatively narrow space is available for the inclusion of the resilient element.

Figure 7:
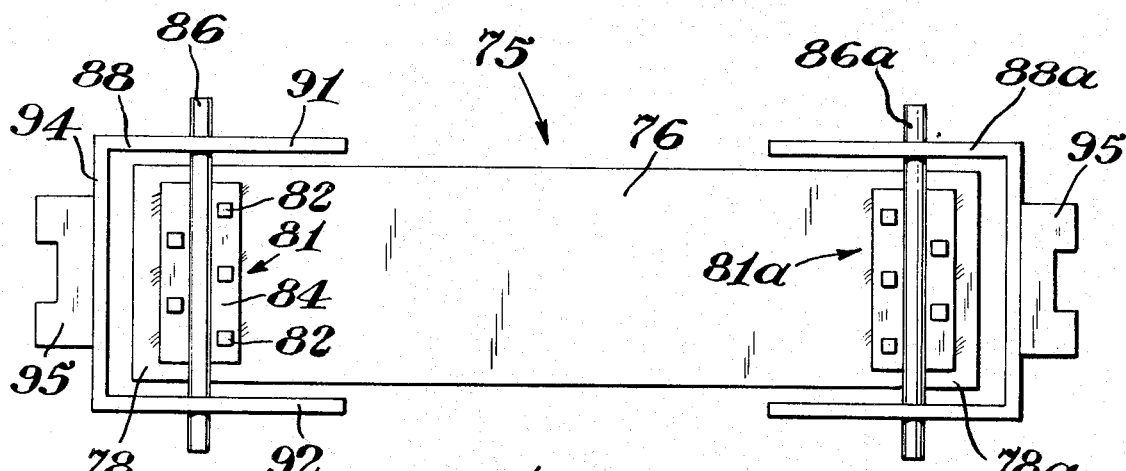

In FIg. 7 there is schematically depicted another embodiment of the invention generally designated by the reference numeral 75. The embodiment 75 comprises an elongate rectangular resilient member 76 having a first end 78 and second end 78a. The member 76 is rectangular and has a rectangular cross-section. A first pin assembly 81 is affixed to the member 76 by connection means 82 such as bolts or machine screws. The pin assembly comprises a base plate 84 and a pin 86 affixed to the base plate by welding. The pin 86 extends in a direction generally transverse to the major axis of the member 76 and generally parallel to a major surface thereof. The pin 86 has a length substantially greater than the width of the member 76. A second pin assembly 81a is similarly disposed adjacent the second end 78a. A first yoke assembly 88 slidably engages each end of the pin 86. The yoke assembly comprises a first side member 91 and a second side member 92. Each of the side members 91 and 92 is generally parallel to each other and the members are positioned parallel to the major axis of the member 76 and are spaced a sufficient distance to permit free movement of the member 76 therebetween. The arms 91 and 92 are affixed to a cross member 94 extending between the arms and positioned remotely from the member 76. Affixed to the cross member 94 is a plastic hinge member or affixing means 95 which as depicted in FIG. 7 is a plate-like member. The arms 91 and 92, the cross member 94 and the plate 95 form a unitary body capable of plastic deformation.

Figure 8:
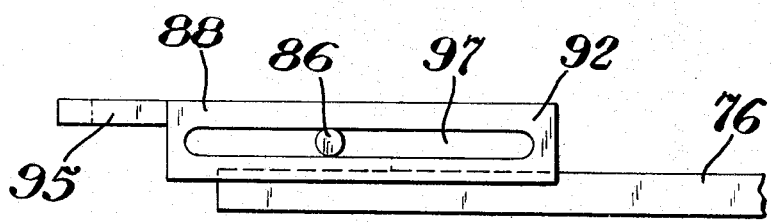
FIG. 8 is a fractional view of a portion of FIG. 7.

FIG. 8 depicts a fractional view of the embodiment 75 of FIG. 7 showing one end of the arrangement of the slot 97 within the arm member 92 and the disposition of the attaching means 95.

The embodiment of FIg. 7 is particularly desirable where large deflections of the resilient member 76 are required. On impact or deflection of the member 76, the member 76 bends until the force becomes sufficient to cause plastic deformation in the yokes 88 which permits still further deflection while maintaining substantial load bearing characteristics. Satisfactory performance is obtained when the member 76 measures 44 × 9 × ¾ inch.

Although the invention has been shown and described employing generally rectangular or cylindrical resilient elements, various other configurations may be employed as desired for particular applications.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A vehicle member, the vehicle member comprising
   a supporting frame, the supporting frame enclosing therein
   a region of probable impact, and
   first and
   second frame portions generally oppositely disposed and having therebetween the region of the probable impact,
   at least one resilient deflectable generally bar shaped member having a major axis, the member being disposed between opposed frame portions and supported by and slidably affixed to said frame portions, the member being slidable in the direction of the major axis whereby an impact in the region of probable impact and deflection of the member, relatively little force is exerted which would serve to draw frame member portions together.

2. The vehicle member of claim 1 including a plurality of resilient deflectable members.

3. The vehicle member of claim 2 wherein the plurality of deflectable members are generally parallel.

4. The vehicle member of claim 1 where the member is a door.

5. The vehicle member of claim 4 wherein the door is a hollow door having resilient members disposed therein.

6. The member of claim 5 wherein the resilient deflectable member has a bar-shaped configuration.

7. The member of claim 6 wherein the bar-shaped member comprises a plurality of longitudinally extending generally parallel glass fibers in a resinous matrix.

8. The member of claim 1 wherein the resilient members are affixed in channel-shaped members to the frame portions.

9. The member of claim 8 wherein the resilient members are secured in the channels by a low strength adhesive.

10. A vehicle door, the vehicle door comprising
    a supporting frame, the supporting frame enclosing therein
    a region of probable impact, the frame having
    first and
    second portions generally oppositely disposed and having therebetween the region of probable impact,
    a plurality of resilient bar-shaped deflectable members, having major axes disposed between opposed frame portions and supported by said frame portions, the resilient members being disposed in generally parallel relationship to each other, each of the resilient members being generally axially slidably supported by the first and second frame portions and retained therein by
    a low strength adhesive whereby an impact in the region of probably impact and deflection of the members, relatively little force is exerted which would serve to draw frame member portions together.

11. A vehicle member, the vehicle member comprising
    a supporting frame, the supporting frame enclosing therein
    a region of probable impact, and
    first and
    second frame portions generally oppositely disposed and having therebetween the region of probable impact,
    at least one resilient deflectable member, the resilient member having at least first and second portions, the first and second portions, one telescoping within the other, the resilient deflectable member being disposed between opposed frame portions and supported by said frame portions.

* * * * *